(12) United States Patent
Robinson

(10) Patent No.: US 8,354,995 B2
(45) Date of Patent: Jan. 15, 2013

(54) INFORMATION STORAGE SYSTEM

(75) Inventor: Ian N. Robinson, Pebble Beach, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2812 days.

(21) Appl. No.: 10/835,174

(22) Filed: Apr. 30, 2004

(65) Prior Publication Data

US 2005/0246492 A1    Nov. 3, 2005

(51) Int. Cl.
*G09G 5/00* (2006.01)

(52) U.S. Cl. ........ 345/156; 345/157; 345/160; 345/163; 345/168; 345/169

(58) Field of Classification Search ........... 345/156, 345/157, 160, 161, 163, 168, 169
See application file for complete search history.

(56) References Cited

U.S. PATENT DOCUMENTS

| | | | |
|---|---|---|---|
| 5,384,890 A * | 1/1995 | Anderson et al. | 704/200 |
| 5,563,631 A | 10/1996 | Masunaga | |
| 5,714,972 A | 2/1998 | Tanaka et al. | |
| 5,848,295 A * | 12/1998 | Anderson et al. | 710/7 |
| 6,084,584 A * | 7/2000 | Nahi et al. | 715/864 |
| 6,137,479 A | 10/2000 | Olsen et al. | |
| 6,388,657 B1 * | 5/2002 | Natoli | 345/168 |
| 6,466,154 B1 | 10/2002 | Kim et al. | |
| 6,573,915 B1 * | 6/2003 | Sivan et al. | 715/781 |
| 6,842,795 B2 * | 1/2005 | Keller | 710/15 |
| 6,897,833 B1 * | 5/2005 | Robinson et al. | 345/2.3 |
| 2003/0061610 A1 | 3/2003 | Errico | |

FOREIGN PATENT DOCUMENTS

WO    WO 02/01545    1/2002

OTHER PUBLICATIONS

Webster's II New Riverside Dictionary, 1996, Houghton Mifflin Company, revised edition, p. 631.*
Longfine, http://www.longfine.com.
Wisdom-Screenhunter, http://www.wisdom-soft.com/products/screenhunter.htm.

* cited by examiner

*Primary Examiner* — My-Chau T Tran

(57) ABSTRACT

A system for storing information includes a computing device having a display and a processor for controlling the display. The system includes a portable storage device configured to communicate with the computing device. The portable storage device includes a PSD display, a PSD processor configured to control the PSD display, and a PSD memory. The system also includes an input mechanism configured to enable selection of information displayed on at least a portion of the display and to activate an information capture application. In addition, the information capture application is configured to assign a visual cue to the selected information. The information capture application is further configured to store the selected information and the assigned visual cue in the PSD memory in response to activation of the input mechanism.

18 Claims, 5 Drawing Sheets

INFORMATION STORAGE SYSTEM

BACKGROUND OF THE INVENTION

A person may be presented with many pieces of information on a daily basis. When such a person comes across a piece of information that is important, that person may try to store the information for future reference in some way. For example, a phone number for a restaurant may be recorded on a loose piece of paper, in a notebook or a planner, or in a database in a computer. If the information is not of long term interest to the person, the information may later be thrown away, crossed out or deleted from the computer.

If the useful information is presented on a computer screen, a user can copy the information by hand or select and save the information in some way on the computer. Saving the information in the computer involves making a selection, choosing to save the selection, and assigning the selection to a location and a file name. Another method includes copying and pasting the information into an electronic note file, such as the "Notes" section of MICROSOFT OUTLOOK, which involves opening an application, selecting a new "Note," and pasting the information into the "Note" to store the information. Should the user wish to have access to the stored information at a location away from the computer, for instance, on a personal digital assistant ("PDA") or a POCKET PC, the user must also manually download or copy the file to the portable device. This process requires that the user annotate or format the information such that it can be stored in a proper format in the portable device.

As can be seen from the above, conventional techniques for saving information viewed on a computer screen typically require users to perform a number of steps. In this regard, conventional techniques require a great deal of user intervention.

SUMMARY OF THE INVENTION

According to an embodiment, the present invention pertains to a system for storing information. The system includes a computing device having a display and a processor for controlling the display. The system includes a portable storage device configured to communicate with the computing device. The portable storage device includes a PSD display, a PSD processor configured to control the PSD display, and a PSD memory. The system also includes an input mechanism configured to enable selection of information displayed on at least a portion of the display and to activate an information capture application. In addition, the information capture application is configured to assign a visual cue to the selected information. The information capture application is further configured to store the selected information and the assigned visual cue in the PSD memory in response to activation of the input mechanism.

BRIEF DESCRIPTION OF THE DRAWINGS

Features of the present invention will become apparent to those skilled in the art from the following description with reference to the figures, in which.

DETAILED DESCRIPTION OF THE INVENTION

Figure 1:
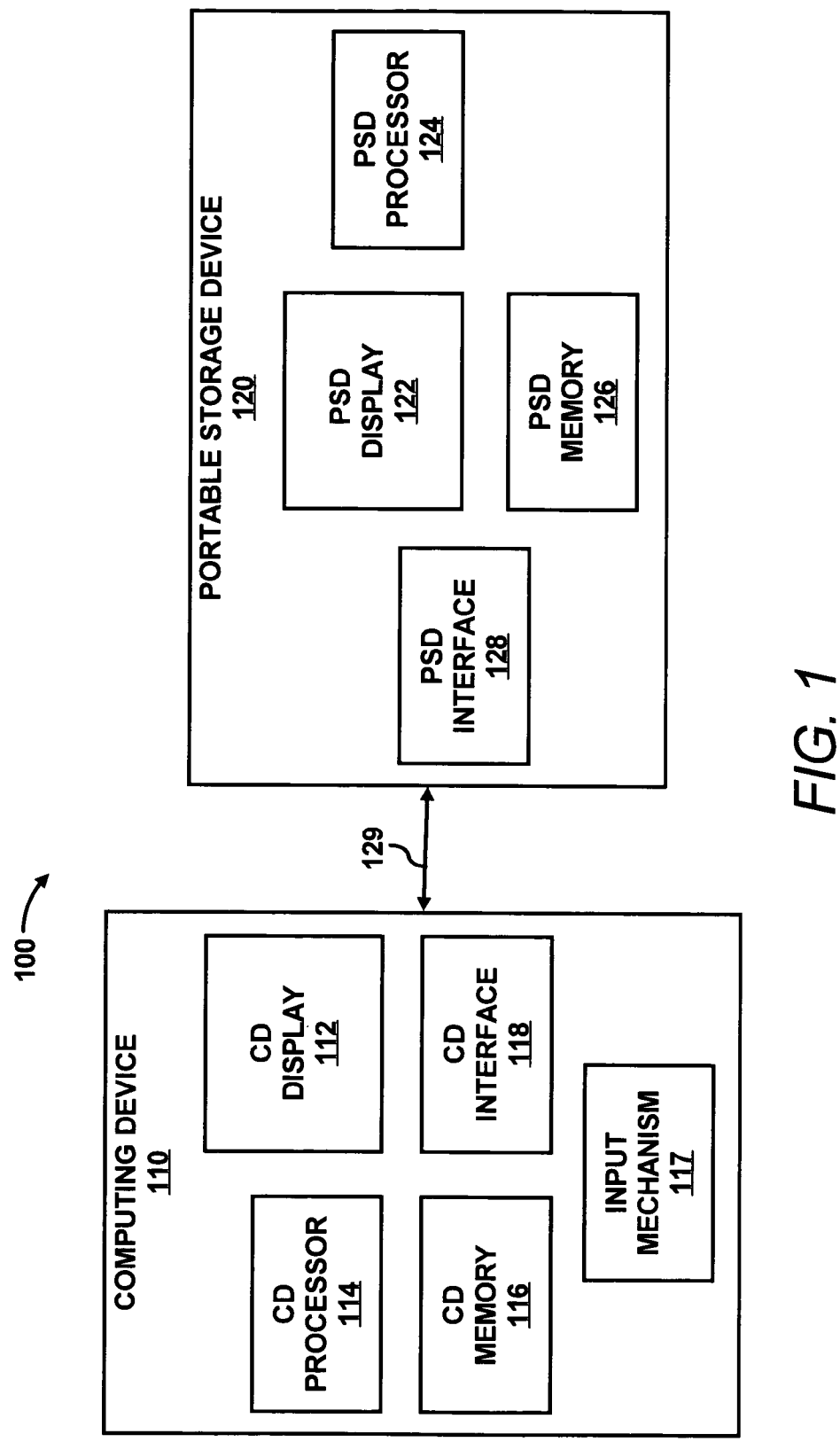
FIG. 1 is a block diagram illustrating an example of an information storage system including a computing device and a portable storage device, according to an embodiment of the invention.

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Throughout the present disclosure, reference is made to "computing device". For purposes of simplicity, "computing device" may generally be defined as any device including a processor, a memory, input means, and a display. For instance, "computing device" may include a personal computer, a laptop computer, a PDA, a POCKET PC, a mobile phone, a digital camera, an MP3 player, etc. It should be readily apparent, however, that the term "computing device" is not intended to denote only computers. Instead, any type of device having the capabilities described with reference to a computing device below may be employed. In addition, "computing device" may denote any type of device known to those of ordinary skill in the art that may be used to view electronic files and perform applications.

An information storage system allows capture of a selected portion of information, from content displayed on a computer screen, through activation of an information capture application. The selected portion of information may comprise a portion of an image displayed on the computer screen. For instance, the selected portion may include part of an image or text contained in a "clipboard" buffer (WINDOWS), or the selected portion may include an arbitrary rectangular bitmap whose boundary may be defined through a click and drag operation of, for instance, a computer mouse. Once activated, the information capture application generally operates to automatically save the information selection in a predetermined information capture storage location along with a visual cue of the information selection created through a predetermined process. For example, the information capture application may assign a portion of the text of a text selection as the visual cue for the text selection. In another example, if the information selection includes an image, the information capture application may create and assign a thumbnail, which may comprise a condensed version of the selected information image as the visual cue. Thus, a user desiring to store an information selection is not required to select a name or location for storing the information selection. In this regard, the user may be able to store the desired information in a relatively simple manner and without requiring a great deal of user intervention.

The information selection may then be compressed and transmitted to a portable storage device through a communications link. The compressed information selection is stored in an information capture storage area of the portable storage device and is available for viewing in a display of the portable storage device. The portable storage device may allow scrolling through a plurality of information selection files stored in the information capture storage area. The information selection may also be moved around on the display of the portable storage device, for instance, if the information selection is too large for the entire information selection to be viewed on the display. In addition, the portable storage device may be configured to transmit an information selection to another device, such as a cell phone, printer, another computing device, another portable storage device, etc.

The information storage system may be stored in a computing device, which may include the information capture application. The information capture application may be activated through a number of various manners. For instance, an icon for the information capture application may be provided on a display of the computing device. As another example, a function key or a set of keys on an input device, for instance, a keyboard, of the computing device may be configured to activate the information capture application. As a yet further example, the portable storage device may include one or more selection mechanisms, for instance, keys or buttons, which may be configured to activate the information capture application.

Thus, for example, a user may select a portion of an image displayed on a display, such as by creating an arbitrary rectangular box around a desired portion of the displayed image. The user may also activate the information capture application through implementation of one of the above-identified activation means. The information capture application may determine if information has been selected. If no information has been selected, the information capture application may request that the user select information for storage.

Once the information capture application has ascertained that information has been selected, the information capture application may assign a visual cue of the selected information. The visual cue may comprise, for instance, a compressed image (thumbnail) of the selected information, or in the event that the image contains text, the visual cue may comprise a portion of the text contained in the selected image. The information capture application may then store the selected information along with the visual cue in an information capture storage location. The information capture application may also compress the selected image to be storable on the portable storage device. The compressed file may then be transmitted to the portable storage device along with the visual cue through a communications link. The selected image may be stored in an information capture data storage of the portable storage device. The selected image may be viewed by the user on a display of the portable storage device, for instance, when the user is away from the computing device.

The portable storage device may also enable a user to manipulate images displayed on the display of the portable storage device. For instance, the portable storage device may comprise one or more mechanisms for images to be scrolled and/or panned. As another example, the one or more mechanisms may also enable a user to assign priorities to the saved information files or to delete the information files.

FIG. 1 shows a block diagram illustrating an example of an information storage system 100. The information storage system 100 includes a computing device 110 and a portable storage device 120. The computing device 110 is linked to the portable storage device 120 through a bi-directional link 129. The computing device 110 includes a computing device (CD) display 112, a CD processor 114, a CD memory 116, an input mechanism 117, and a CD interface 118. In this regard, the computing device 110 may comprise a personal computer, a laptop computer, a PDA, a POCKET PC, a mobile phone, a digital camera, an MP3 player, etc.

The CD display 112 may include any type of display or screen and may be used to display information, including images and/or text. In addition, the CD display 112 may form a separate apparatus from the computing device 110 or the CD display 112 may be integrally formed with the computing device 110. Although not explicitly shown, the computing device 110 may include drivers or adapters configured to receive display data from, for instance, the CD processor 114 and convert the display data into display commands for the CD display 112.

The CD processor 114 may be configured to control various operations of the computing device 110. For instance, the CD processor 114 may receive input from the input mechanism 117 and may be operable to perform various functions based upon the received input. In this regard, the CD processor 114 may comprise a microprocessor, a micro-controller, an application specific integrated circuit (ASIC), and the like. In performing these functions, the CD processor 114 may access information or software stored in the CD memory 116. The CD memory 116 may comprise a traditional memory device, for instance, volatile or non-volatile memory, such as DRAM, EEPROM, flash memory, combinations thereof, and the like.

Figure 2A:
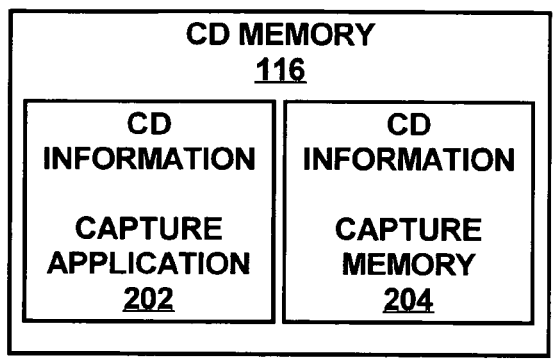
FIG. 2A is a block diagram illustrating a memory useable with the computing device illustrated in FIG. 1, according to an embodiment of the invention.

With reference to FIG. 2A, there is shown a block diagram 200, which shows in greater detail the CD memory 116. As shown in FIG. 2A, the CD memory 116 may store software applications, such as, a CD information capture application 202, which is described in more detail below with reference to FIG. 6. The CD memory 116, also stores data, for example, captured information files, which are illustrated as being stored in a CD information capture memory 204.

Referring back to FIG. 1, the CD processor 114 of the computing device 110 may execute commands, such as, commands associated with the information capture application 202 depicted in FIG. 2A. The information capture application 202 may be activated through use of the input mechanism 117. The input mechanism 117 may include any type of input mechanism, such as, for example, a keyboard, a touch pad, a mouse, and the like. In one instance, the input mechanism 117 may be used to select information to be captured and/or to select the CD information capture application 202 to initiate a process to store selected information. The information may be selected by, for instance, creating an arbitrary rectangular box around the information to be selected on the CD display 112.

As described in greater detail hereinbelow, an icon on the CD display 112, a function key, for instance, on a keyboard (not shown), or a button on a computer mouse, may be selected to activate and initiate the information capture application 202. Once initiated, the information capture application 202 is configured to store the selected information and to assign a visual cue to the selected information. The visual cue may comprise a form of identifying the selected information, such as, for instance, a filename, part of the selected information, a date and time when the information capture application 202 was activated to store the selected information, a compressed image of the selected information, etc. In this regard, the information may be captured, stored and assigned an identifying reference with a single act by the user.

The captured and stored information may be transmitted to a portable storage device 120 through a communications link 129. Again, the transmission of the stored information may be performed through activation of the CD information capture application 202, as described hereinabove. In this regard, a user is not required to perform any additional steps in order for the desired information to be transmitted to the portable storage device 120.

The CD interface 118 of the computing device 110 generally enables communications between the computing device 110 and other devices, such as the portable storage device 120. The CD interface 118 may therefore operate to enable transmission of the stored information to the portable storage device 120. The portable storage device 120 generally comprises a relatively small computing device capable of being easily transported. Accordingly, the portable storage device 120 may comprise, for instance, sufficiently small dimensions to enable the portable storage device 120 to be held in a user's hand.

The portable storage device 120 includes a portable storage device (PSD) display 122, a PSD processor 124, a PSD memory 126, and a PSD interface 128. The PSD display 122 may include any reasonably suitable type of screen, such as, a liquid crystal display ("LCD"), and may be used to display information, including images and/or text. Although not explicitly shown, the computing device 110 may include drivers or adapters configured to receive display data from, for instance, the PSD processor 124 and to convert the display data into display commands for the PSD display 122.

In one regard, the PSD display 122 may be used to view captured information stored in the PSD memory 126. The stored information selections may be displayed on the PSD display 122 as a list of visual cues. A particular stored information selected may be selected and viewed through, for instance, scrolling through the list of visual cues and selecting the visual cue associated with the desired stored information. In one example, a user may scroll through the list of visual cues, determine which of the visual cues is assigned to the file the user wishes to view, select the desired visual cue, and view the selected file on the PSD display 122.

The PSD processor 124 may be configured to control various operations of the portable storage device 120. For instance, the PSD processor 124 may be operable to enable viewing of captured information stored in the PSD memory 126. In this regard, the PSD processor 124 may comprise a microprocessor, a micro-controller, an application specific integrated circuit (ASIC), and the like. In performing these functions, the PSD processor 124 may access information or software stored in the PSD memory 116. The PSD memory 126 may comprise a traditional memory device, for instance, volatile or non-volatile memory, such as DRAM, EEPROM, flash memory, combinations thereof, and the like.

Figure 2B:
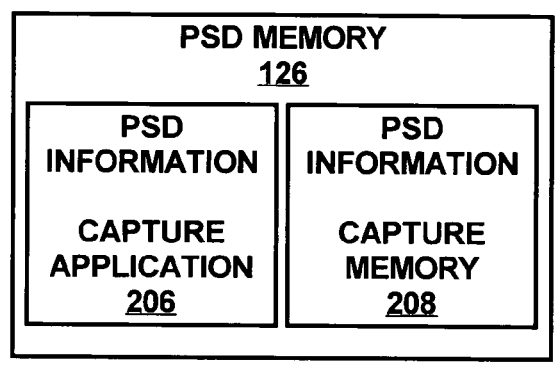
FIG. 2B is a block diagram illustrating a memory usable with the portable storage device illustrated in FIG. 1, according to an embodiment of the invention.

With reference to FIG. 2B, there is shown a block diagram 210, which depicts in greater detail the PSD memory 126. As shown in FIG. 2B, the PSD memory 126 may store a captured information file in a PSD information capture memory 208. The PSD memory 126 may also store software applications, such as a PSD information capture application 206. The PSD information capture application 206 may be implemented to activate the capture of information selected on the CD display 112, as is described in greater detail hereinbelow. The PSD information capture application 206 may also be configured to enable, for instance, captured information files to be browsed and viewed. In addition, the PSD information capture application 206 may enable the captured information files to be manipulated and/or transmitted.

The PSD information capture application 206 may also be configured to determine, for instance, when the captured information files may be deleted or otherwise discarded from the PSD information capture memory 208. In one example, the PSD information capture application 206 may be designed to track when a captured information file was stored in the PSD information capture memory 208. In this example, the PSD information capture application 206 may be configured to discard the captured information file after the captured information has been stored in the PSD information capture memory 208 for a predefined period of time.

As another example, the PSD information capture application 206 may be configured to categorize various captured information files according to their priorities. The priorities of the captured information files may be designated, for instance, by a user. In this example, the PSD information capture application 206 may be configured to save higher priority files and discard lower priority files when the space available in the information capture memory 208 is limited. Alternatively, the PSD information capture application 206 may be configured to store the various captured information files into separate folders, for instance, a "favorites" folder, a "to-do" folder, etc.

As a further example, the PSD information capture application 206 may be configured to store the captured information files in the order that they are received. In this example, the files that have been received earliest may be removed as new captured information files are received. Again, this example may be implemented by the PSD information capture application 206 if space in the information capture memory 208 becomes relatively limited. The PSD information capture application 206 may also be configured to implement combinations or variations of the examples described hereinabove.

With reference back to FIG. 1, the PSD processor 124 may execute commands, such as those commands listed above which are associated with the information capture application 206. In addition, the PSD processor 124 may be configured to communicate with the computing device 110, as well as other devices, through the PSD interface 128. The PSD interface 128 generally enables communications with the computing device 110 through the bi-directional link 129. More particularly, the PSD interface 128 is configured to communicate with the CD interface 118 of the computing device 110. Any reasonably suitable known communications means may be employed to enable communications between the CD interface 118 of the computing device 110 and the PSD interface 118 of the portable storage device 120.

By way of example, the bi-directional link 129 or the communications means may comprise a wired link, such as a universal serial bus ("USB") connection or a FIRE WIRE connection between the interface 118 and the interface 128. As another example, the communications means may be effectuated through a wireless link, such as IEEE 802.11b, 802.11g, wireless serial connection, Bluetooth, infrared, etc., or combinations thereof.

In this regard, information may be captured from the computing device 110 and stored in the portable storage device 120. For instance, a user may select some information, text, images, audio files, etc., to be stored in the portable storage device 120. In one example, the captured information file may be stored directly into the PSD memory 126 through the bi-directional link 129. In another example, the captured information file may be stored into the CD memory 116 and may be copied into the PSD memory 126 through the bi-directional link 129. In this example, the captured information files may be stored in the CD memory 116 in manners similar to those described hereinabove with respect to the PSD information capture memory 208. In addition, the files stored in the CD memory 116 may be synchronized with the files stored in the PSD memory 126 such that the files stored on each device 110, 120 is the same. Alternatively, the CD memory 116 may store files for longer periods of time and may store a larger number of files, for instance, if the CD memory 116 has a larger memory space.

Figure 3:
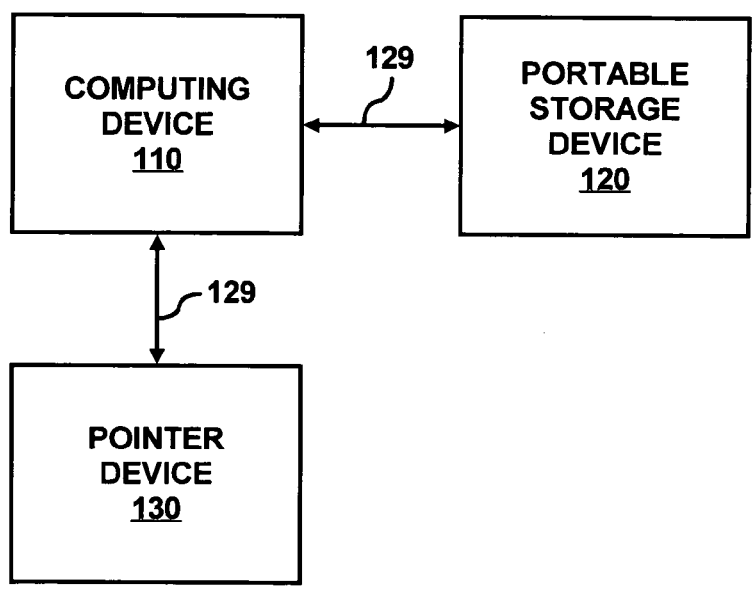
FIG. 3 is a block diagram illustrating an example of a portable storage device including a pointer device, according to an embodiment of the invention.

Referring now to FIG. 3, there is illustrated another example of an information storage system 300. The information storage device 300 includes the computing device 110, the portable storage device 120, and a pointer device 130. The pointer device 130 may be used to perform selection operations on the display 112 of the computing device 110. For instance, the pointer device 130 may be used to select a portion of content on the display for storage and/or select the information capture application 202 to initiate a process to store information. In addition, the pointer device 130 may be employed to perform various other functions with respect to the computing device 110. By way of example, the pointer device 130 may be configured to operate as a conventional computer mouse and may thus operate as an input mechanism 117 for the computing device 110.

The computing device 110 may be linked to the pointer device 130 through the same or another bi-directional link 129. As described hereinabove, the bi-directional link 129 may include any reasonably suitable known means for enabling communications between the pointer device 130 and the computing device 110. For instance, the bi-directional link 129 may be designed to enable position information to be sent from the pointer device 130 to the computing device 110. By way of example, the communications means may comprise a wired link, such as an USB or a FIRE WIRE connection between the computing device 110 and the pointer device 130 or a wireless link, such as EEE 802.11b, 802.11g, wireless serial connection, Bluetooth, infrared, etc., or combinations thereof.

The portable storage device 120 may include a variety of portable or mobile devices. For example, the portable storage device 120 may itself comprise the pointer device 130. That is, the portable storage device 120 may also function as a computer mouse capable of operating as an input mechanism 117 for the computing device 110, as described in greater detail with respect to FIGS. 4A and 4B. In addition, the portable storage device 120 may comprise a separate pointer device, a PDA, a POCKET PC, an MP3 player, a digital camera, or a mobile phone having the attributes described above, with respect to FIGS. 1 and 2B, and the like.

Figures 4A, 4B:
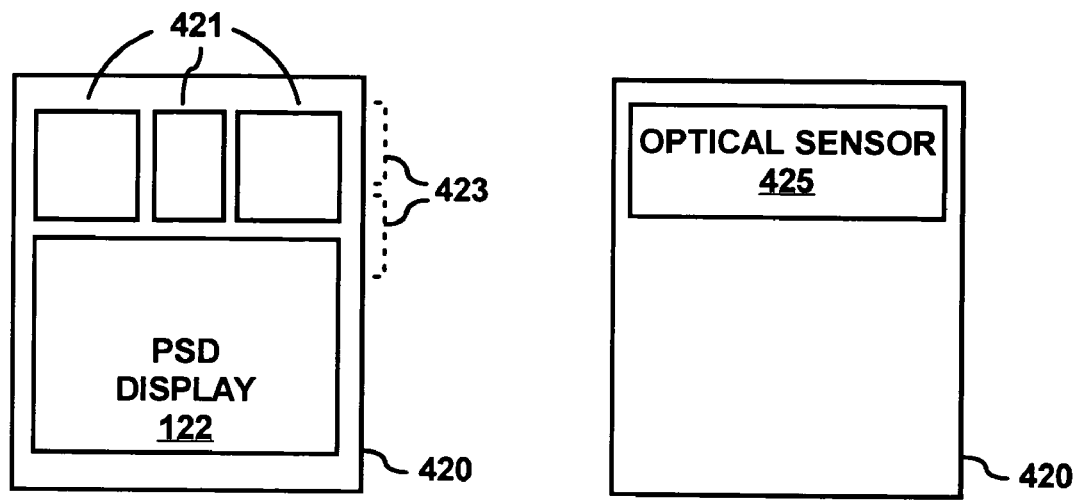
FIGS. 4A and 4B, collectively, illustrate an example of portable storage device illustrated in FIG. 3, according to an embodiment of the invention.

FIGS. 4A and 4B illustrate an example of a portable storage device 420 that is a combination of the portable storage device 120 and the pointer device 130 depicted in the system 300 (FIG. 3). FIGS. 4A and 4B depict a simplified view of the portable storage device 420. Thus, other features may be added and existing features may be removed or modified without departing from a scope of the example of the portable storage device 420 depicted in FIGS. 4A and 4B. In addition, the portable storage device 420 includes all of the features and functionalities of the portable storage device 120 depicted in FIG. 1.

With reference first to FIG. 4A, there is shown a top view of the portable storage device 420. The portable storage device 420 generally comprises a computer mouse. More particularly, the portable storage device 420 may comprise some or all of the functionalities of a conventional computer mouse. In this regard, the portable storage device 420 is generally sized and shaped to fit comfortably in a user's hand.

As shown in FIG. 4A, the portable storage device 420 includes keys or buttons 421, which may typically be found on a computer mouse. One of the keys 421, for instance, the center key 421, may comprise a scroll wheel. The keys 421 may generally operate in manners similar to those found with respect to conventional mouse keys. Thus, for instance, the keys 421 may be employed to activate or deactivate various programs or software operating on the computing device 110. The portable storage device 420 may also be employed to enable movement of a pointer, cursor, or other symbol on the CD display 112.

The portable storage device 420 also includes the PSD display 122 described hereinabove. As also described hereinabove, the PSD display 122 may be used to view captured information files stored in the PSD information capture memory 126, as described above with reference to FIG. 2B. As will be described in greater detail hereinbelow, the images displayed on the PSD display 122 may be manipulated through various operations of the portable storage device 420.

The portable storage device 420 may also include one or more optional selection mechanisms 423, shown in dashed lines, for providing additional functionality to the portable storage device 420. One of the additional functionalities includes, for instance, the ability to scroll through captured information files and/or to select a captured information file for viewing. The one or more optional selection mechanisms may also be used to capture information files displayed on the CD display 112. For instance, one or more of the selection mechanisms 423 may be employed to activate one or both of the PSD information capture application 206 and the CD information capture application 202. In this regard, the information files of an image displayed on the CD display 112 may be captured through activation of the one or more selection mechanisms 423. The selection mechanisms 423 may include buttons, keys, scroll wheels, or other known mechanisms that may be used to select or manipulate files stored in the portable storage device 420.

In FIG. 4B, there is shown a bottom view of the portable storage device 420. As shown, the portable storage device 420 includes an optical sensor 425. The optical sensor 425 generally performs the same position sensing functions as in a typical optical computer mouse. The optical sensor 425 may also be used to move an image around in the PSD display 122. For instance, movements of the portable storage device 420 may be read by the optical sensor 425, which may correlate with movements of an image shown in the PSD display 122. The optical sensor 425 may also be used to pan an information selection that is too large to be displayed completely within the PSD display 122 through movement of the portable storage device 420. The panning action may be performed by moving the portable storage device 420 on a surface or by moving a finger over the optical sensor 425.

Although the portage storage device 420 has been described as including an optical sensor 425, the portable storage device 420 may instead include, for instance, a roller ball or a track ball, without deviating from a scope of the portable storage device 420 described hereinabove.

The portable storage device 420 may also support various applications in addition to allowing viewing of captured information files. For example, the portable storage device 420 may be used as a presentation remote, where supplemental information, such as, speaker notes or a slide-sorter list for choosing the next slide, is shown on the PSD display 122. In this example, the portable storage device 420 may function to control a projector or a computer system, such that a user may vary displayed items through operation of the portable storage device 420.

As another example, the portable storage device 420 may include a camera (not shown), either integrally formed with the portable storage device 420 or as an attachment to the portable storage device 420, to enable images to be obtained and stored directly in the portable storage device 420. As further example, the portable storage device 420 may include a microphone (not shown), also either integrally formed with the portable storage device 420 or as an attachment to the portable storage device 420, to enable sound to be obtained and stored directly in the portable storage device 420.

Figure 5:
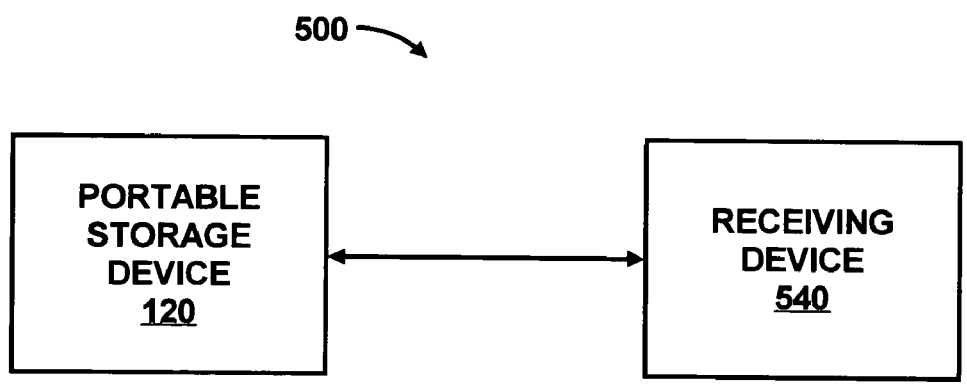
FIG. 5 is a block diagram illustrating an example of the information storage system depicted in FIG. 1, where the portable storage device is configured to transmit captured information files to a receiving device, according to an embodiment of the invention.

FIG. 5 is a block diagram of a storage information system 500 in which a portable storage device 120 (or portable storage device 420) is configured to communicate with a receiving device 540. The receiving device 540 may include, for instance, a computing device 110, a printer, a camera, another portable storage device 120, 420, and the like. As shown, a portable storage device 120, 420, may be used to relay content between the portable storage device 120, 420 and the receiving device 540. For example, a user may use a portable storage device 120, 420 on different computing devices 110 to be able to retain accessibility to a stored captured information file.

Figure 6:
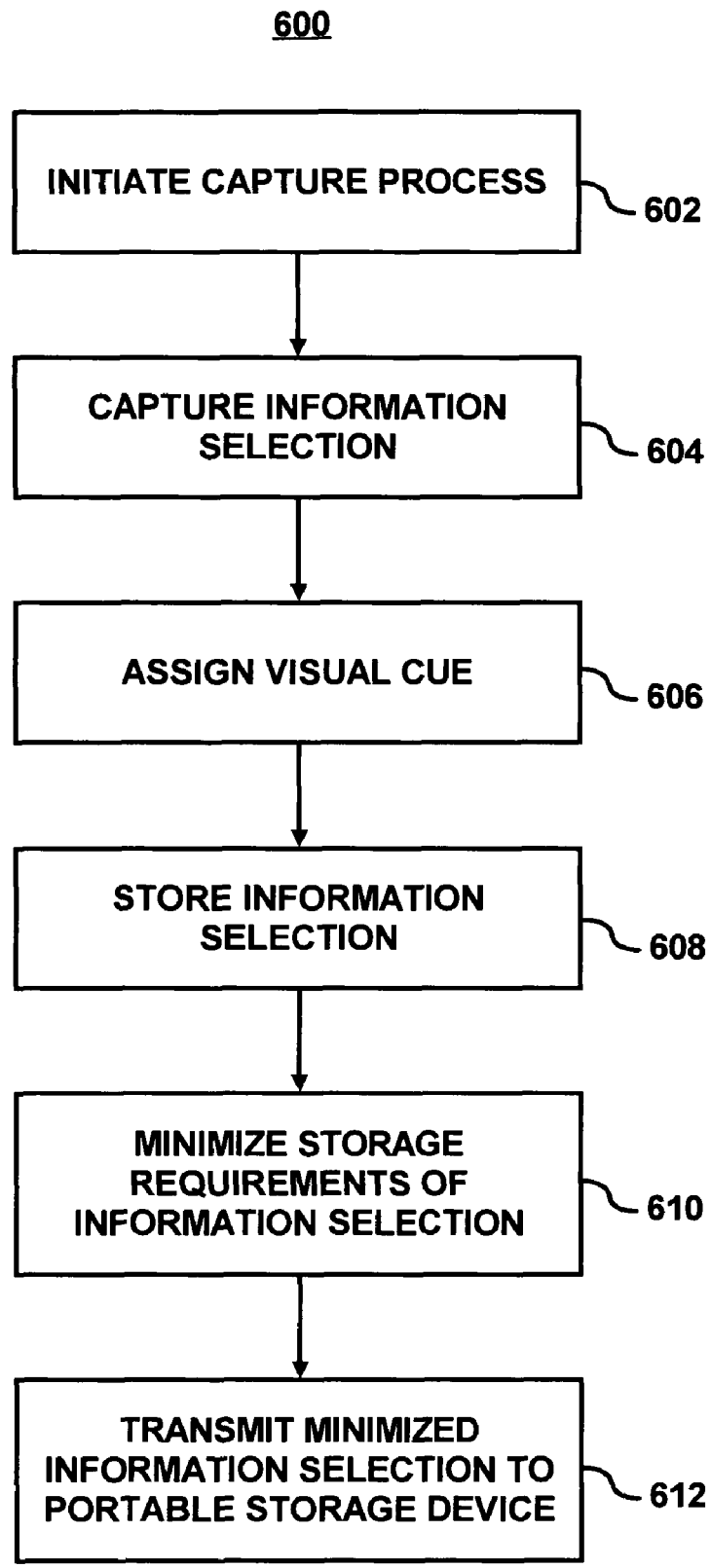
FIG. 6 is a flow diagram illustrating a process for storing information with the portable storage device depicted in FIGS. 1 and 3, according to an embodiment of the invention.

FIG. 6 illustrates a flow diagram of an operational mode 600 of a method for information storage utilizing an information capture application 202, 206. It is to be understood that the following description of the operational mode 600 is but one manner of a variety of different manners in which the method for information storage may be practiced. It should also be apparent to those of ordinary skill in the art that the operational mode 600 represents a generalized illustration and that other steps may be added or existing steps may be removed, modified or rearranged.

The description of the operational mode 600 is made with reference to the block diagrams 100 illustrated in FIG. 1, and the block diagrams illustrated in FIGS. 2A and 2B, and thus makes reference to the elements cited therein. It should, however, be understood that the operational mode 600 is not limited to the elements set forth in the block diagrams of FIGS. 1, 2A and 2B. Instead, it should be understood that the operational mode 600 may be practiced by a portable information storage system having a different configuration than those set forth in the block diagrams of FIGS. 1, 2A and 2B.

The operational mode 600 may be initiated or started through initiation of an information capture process, at step 602. As described hereinabove, the information capture process, or an information capture application 202, 206, may be initiated through a variety of means. For instance, a user may select to capture information by clicking on an icon on the CD display 112, by depressing a function key (or other keys) on a keyboard, or by selecting a key or button on the portable storage device 120, 420. Thus, a user may initiate the information capture application 202, 206 by a single operation on the user's part.

The selected information may be captured through operation of one or both of the information capture applications 202, 206. The information selection may include any type of information available on a computer. For example, the information selection may include a portion of a text string, an image, an audio file, a combination of these information types, and the like. In addition, the selected information may include a portion of an image displayed on the computer screen. For instance, the selected portion may include part of an image or text contained in a "clipboard" buffer (WINDOWS), or the selected portion may include an arbitrary rectangular bitmap whose boundary may be defined through a click and drag operation of, for instance, a computer mouse. In a more specific example, the information selection may include an appointment from a calendar application or a portion of a map found on the Internet.

In a first example, the computing device 110 may include a CD information capture application 202. The CD information capture application 202 may operate to capture the selected information at step 604. In capturing the selected information, the CD information capture application 202 may be configured to format the selected information into, for instance, an image file, such as, Portable Document Format (PDF), Tagged Image File Format (TIFF), and the like. In addition, the CD information capture application 202 may be configured to assign a visual cue to the captured information at step 606. The visual cue may be based according to a predetermined visual cue assignment process. The predetermined visual cue assignment process may include assigning a thumbnail version of the information selection if the information selection is an image, assigning some portion of text related to the information selection if the information selection is a text string or an audio file, some combination of the two, etc. For instance, the visual cue may comprise the date and time of when the information selection was captured.

The capture step may also include detecting if an information selection has been made by the user. If the user did not select information before selecting to initiate the information capture application 202, the information capture application 202 may cause the computing device 110 to request that the user make an information selection. This step may include presenting the user with a pop up box requesting the user to make a selection.

The captured information and the visual cue may be stored in the CD information capture memory 204 as indicated at step 608. As may be seen from the above, desired information may be captured and stored in the computing device 110 with minimal user intervention. In addition, the stored information may be transmitted and stored on the portable storage device 120, 420. Prior to transmitting the stored information, the CD information capture application 202 may be configured to minimize the storage requirements of the stored information, as indicated at step 610. For example, known compression techniques may be performed on the stored information. The stored information, either in complete or compressed form, may be transmitted to the portable storage device 120, 420 at step 612. In this regard, a user may later access the stored information from the portable storage device 120, 420 as described hereinabove.

According to another example, the capture initiation process at step 602 may be initiated through the portable storage device 120, 420 and the PSD information capture application 206 may be activated to capture information from the computing device 110. For instance, the capture initiation process at step 602 may be initiated through activation of one of the keys 421 or the optional selection mechanisms 423. As described in greater detail hereinabove, a user may depress or otherwise activate one of the keys 421 or the optional selection mechanisms 423 to capture information displayed on the CD display 112. In this example, the CD memory 116 may include a driver or other application to enable access by the PSD processor 124 to the information displayed on the CD display 112.

The PSD information capture application 206 may operate to perform the steps indicated hereinabove with respect to the CD information capture application 202. Thus, for instance, the PSD information capture application 206 may be configured to capture the information selection at step 604. In addition, the PSD information capture application 206 may also format the captured information as well as assign a visual cue to the captured information at step 606. Moreover, the PSD information capture application 206 may be configured to store the selected information in the PSD information capture store 208 at step 608. The PSD information capture application 206 may also be configured to minimize the storage requirements of the information selection at step 610 and to receive the information selection from the computing device 110.

In any regard, the captured information file may be stored in either or both of the CD and PSD information capture stores 204, 208 according to the order in which the file was created. In another example, the captured information file may be assigned a certain priority level or the captured information file may be stored in a high priority area. For example, the captured information file may be assigned a high priority or stored in a high priority area and thus may not be deleted unless a user actively deletes the file.

In the first example, when a new captured information file is stored in either of the CD or PSD information capture stores 204, 208, for instance, and the CD or PSD information capture memory 204, 208 is out of storage capacity, the earliest stored captured information file may be deleted to make space available for the new captured information file. In the second example above, if a captured information file is assigned a high priority or is stored in a high priority area, such as in a folder labeled "special," the captured information file may not be deleted unless there are no more captured information files in the general area and it is the earliest stored file in the high priority area.

The method of storing information may also include storing captured information files so that they may be dynamically updated. A source indicator may be stored with the information selection in the captured information file. The information capture application 202 may periodically examine the source of each information selection according to the source indicator to determine if content of the information selection has changed. For example, if the information selection is an appointment on a calendar, the location of the appointment may change. If the content information selection has changed, the information selection may be updated in the CD information capture memory 204, and a minimized version of the changed information selection may be transmitted to the portable storage device 120, 420 to update the content of the information selection stored in the PSD information capture memory 208.

The operations set forth in the operational mode 600 may be contained as a utility, program, or subprogram, in any desired computer accessible medium. In addition, the operational mode 600 may be embodied by a computer program, which can exist in a variety of forms both active and inactive. For example, it can exist as software program(s) comprised of program instructions in source code, object code, executable code or other formats. Any of the above can be embodied on a computer readable medium, which include storage devices, in compressed or uncompressed form.

Exemplary computer readable storage devices include conventional computer system RAM, ROM, EPROM, EEPROM, and magnetic or optical disks or tapes. Concrete examples of the foregoing include distribution of the programs on a CD ROM. The same is true of computer networks system with a computer storage device in general. It is therefore to be understood that any electronic device capable of executing the above-described functions may perform those functions enumerated above.

Figure 7:
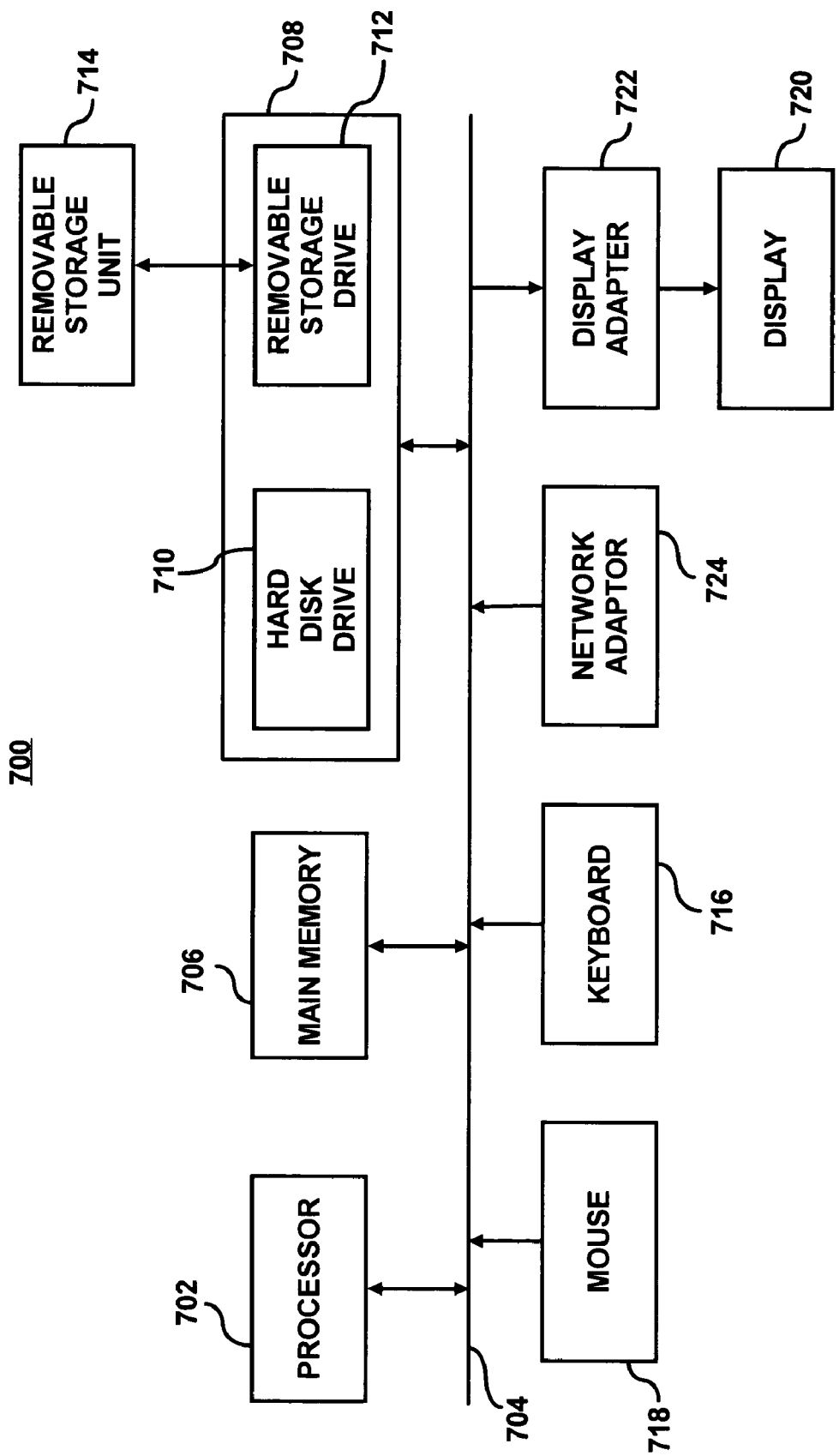
FIG. 7 is a block diagram illustrating an example of a computer system operable for use as either or both of the computing device and the portable storage device depicted in FIGS. 1 and 3, according to an embodiment of the invention.

FIG. 7 illustrates an exemplary computer system 700, according to an embodiment. The computer system 700 may include, for example, the computing device 110 and/or the portable storage device 120, 420. In this respect, the computer system 700 may be used as a platform for executing one or more of the functions described hereinabove with respect to the various components of the portable information storage system.

The computer system 700 includes one or more controllers, such as a processor 702. The processor 702 may be used to execute some or all of the steps described in the operational mode 600. Commands and data from the processor 702 are communicated over a communication bus 704. The computer system 700 also includes a main memory 706, such as a random access memory (RAM), where the program code for, for instance, the processor 114 and/or the processor 124, may be executed during runtime, and a secondary memory 708. The secondary memory 708 includes, for example, one or more hard disk drives 710 and/or a removable storage drive 712, representing a floppy diskette drive, a magnetic tape drive, a compact disk drive, etc., where a copy of the program code for the provisioning system may be stored.

The removable storage drive 710 reads from and/or writes to a removable storage unit 714 in a well-known manner. User input and output devices may include a keyboard 716, a mouse 718, and a display 720. A display adaptor 722 may interface with the communication bus 704 and the display 720 and may receive display data from the processor 702 and convert the display data into display commands for the display 720. In addition, the processor 702 may communicate over a network, e.g., the Internet, LAN, etc., through a network adaptor 724.

It will be apparent to one of ordinary skill in the art that other known electronic components may be added or substituted in the computer system 700. In addition, the computer system 700 may include a system board or blade used in a rack in a data center, a conventional "white box" server or computing device, etc. Also, one or more of the components in FIG. 7 may be optional (e.g., user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A system for storing information, comprising:
a computing device having a computing device (CD) display and a processor for controlling the CD display;
a portable storage device (PSD) configured to communicate with the computing device, said PSD being a computer mouse shaped to fit in a user's hand and to function as an input mechanism for the computing device through movement of the user's hand, said PSD further having a PSD display, a PSD processor configured to control the PSD display, and a PSD memory, wherein the PSD includes a PSD interface configured to enable communication with at least one of another computing device, a camera, a printer, and a projector; and
an input mechanism configured to enable selection of information displayed on at least a portion of the CD display and to activate an information capture application, wherein the information capture application is configured to assign a visual cue to the selected information, and wherein the information capture application is further configured to store the selected information and the assigned visual cue in the PSD memory in response to activation of the input mechanism.

2. The system according to claim 1, wherein the input mechanism comprises at least one of an icon on the CD display and a key of a keyboard configured to enable input into the computing device.

3. The system according to claim 1, wherein the computing device further comprises a memory and the information capture application is contained in the memory of the computing device, and wherein the selected information is also stored in the memory of the computing device.

4. The system according to claim 1, wherein the PSD comprises the input mechanism configured to activate the information capture application, wherein the input mechanism comprises a selectable key an the PSD.

5. A system for storing information, comprising:
a computing device having a computing device (CD) display and a processor for controlling the CD display;
a portable storage device (PSD) configured to communicate with the computing device, said PSD having a PSD display, a PSD processor configured to control the PSD display, and a PSD memory; and
an input mechanism configured to enable selection of information displayed on at least a portion of the CD display and to activate an information capture application, wherein the information capture application is configured to assign a visual cue to the selected information, wherein the information capture application is further configured to store the selected information and the assigned visual cue in the PSD memory in response to activation of the input mechanism, wherein the information capture application is stored in the PSD memory, and wherein the PSD processor is configured to operate the information capture application on the computing device.

6. The system according to claim 1, wherein the processor of the computing device is further configured to implement the information capture application to store the selected information and the assigned visual cue in the PSD memory in response to the activation of the input mechanism.

7. The system according to claim 1, wherein the PSD display is configured to enable manipulation of an image displayed on the PSD display.

8. A method for storing information, said method comprising:
selecting at least a portion of information displayed on a display of a computing device;
activating an input mechanism to initiate an information capture application, wherein the step of activating an input mechanism comprises activating an input apparatus provided on the portable storage device; and
in the information capture application, creating a visual cue for the selected information and causing the selected information and the visual cue to be stored in a memory of a portable storage device configured to communicate with the computing device.

9. The method according to claim 8, wherein the step of causing the selected information and the visual cue to be stored comprises causing the selected information and the visual cue to be stored in a memory of the computing device.

10. The method according to claim 8, further comprising: minimizing storage requirements of the selected information prior to the step of causing the selected information and the visual cue to be stored in the memory of the portable storage device.

11. The method according to claim 8, further comprising:
storing a source indicator for the information selection;
examining a source of the information selection according to the source indicator periodically to determine if content of the information selection has changed; and
updating the information selection in the information capture storage.

12. The method according to claim 8, further comprising:
in the information capture application, ordering a plurality of selected information and visual cues according to the chronological order in which the plurality of selected information and visual cues were stored.

13. The method according to claim 8, further comprising:
in the information capture application, assigning one or more of a plurality of selected information with a high level of priority and segregating those one or more selected information from others of the selected information.

14. A system for storing information, said system comprising:
means for selecting information displayed on a display of a computing device;
means for activating a means for capturing information selected through the means for selecting, wherein the means for capturing information comprises means for creating a visual cue for the information selected through the means for selecting, and wherein the means for activating comprises an input apparatus provided on a portable storage device; and
means for storing the selected information and the visual cue, wherein the means for storing comprises means for storing the selected information and the visual cue in the portable storage device.

15. The system according to claim 14, wherein the means for storing comprises means for storing the selected information in a memory of the computing device.

16. The system according to claim 14, wherein the portable storage device is a computer mouse.

17. A tangible computer readable storage medium on which is embedded one or more computer programs, said one or more computer programs implementing a method of storing information, said one or more computer programs comprising a set or instructions for:
selecting information displayed on a display of a computing device;
activating an input mechanism to initiate an information capture application;
in the information capture application, creating a visual cue for the selected information and causing the selected information and the visual cue to be stored in a memory of a portable storage device configured to communicate with the computing device; and
minimizing storage requirements of the selected information prior to the step of causing the selected information and the visual cue to be stored in the memory of the portable storage device.

18. The tangible computer readable storage medium according to claim 17, said one or more computer programs further comprising a set of instructions for:
causing the selected information and the visual cue to be stored in a memory of the computing device.

* * * * *

UNITED STATES PATENT AND TRADEMARK OFFICE
CERTIFICATE OF CORRECTION

PATENT NO. : 8,354,995 B2  Page 1 of 1
APPLICATION NO. : 10/835174
DATED : January 15, 2013
INVENTOR(S) : Ian N. Robinson It is certified that error appears in the above-identified patent and that said Letters Patent is hereby corrected as shown below:

In column 11, line 63, delete "networks" and insert -- network --, therefor.

In column 13, line 19, in Claim 4, delete "an" and insert -- on --, therefor.

In column 14, line 47, in Claim 17, delete "or" and insert -- of --, therefor.

Signed and Sealed this
Ninth Day of April, 2013

Teresa Stanek Rea
*Acting Director of the United States Patent and Trademark Office*